United States Patent Office 3,023,843
Patented Mar. 6, 1962

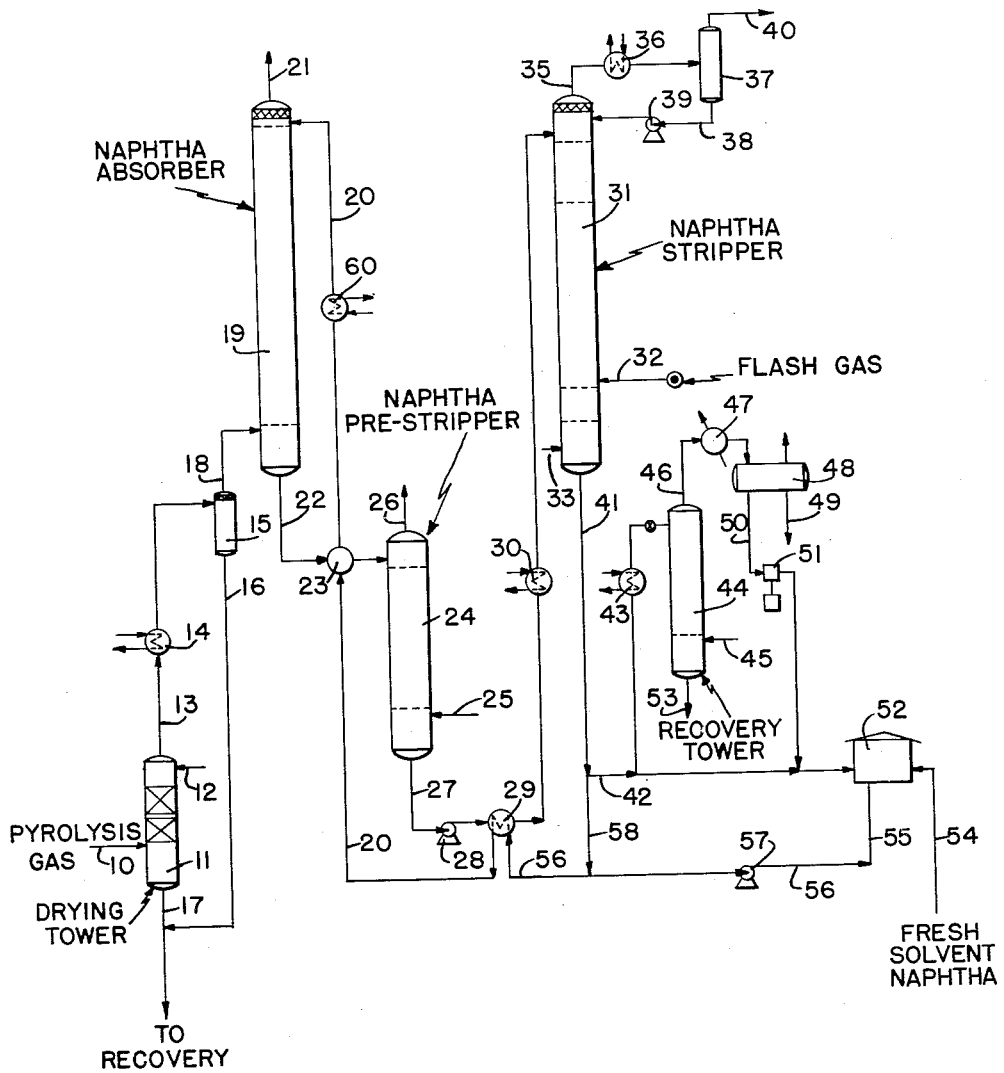

3,023,843
ACETYLENE PURIFICATION
George Craig Grubb, New Shrewsbury, N.J., and Warren W. Walk, Irvington, and Shamsher S. Grover, Elmhurst, N.Y., assignors to The M. W. Kellogg Company, Jersey City, N.J., a corporation of Delaware
Filed Aug. 5, 1958, Ser. No. 753,366
11 Claims. (Cl. 183—115)

This invention relates to a process for the production of acetylene by pyrolysis of a hydrocarbon feed. In one of its aspects this invention relates to the separation of acetylene from the gaseous pyrolysis products. In one of its more particular aspects, this invention relates to the separation of higher acetylenes from an acetylene containing gas.

The principal commercial process for the preparation of acetylene involves the pyrolysis of low boiling petroleum fractions, i.e., light hydrocarbons ranging from normally gaseous hydrocarbons through light naphthas. In these processes, the hydrocarbon feed is maintained under closely controlled conditions of temperature, pressure and reaction time to provide a gas mixture containing a recoverable quantity of acetylene. As indicated, the process is applicable to the conversion of normally gaseous hydrocarbons as well as normally liquid hydrocarbons. In the conversion of normally gaseous hydrocarbons the feed material, preferably preheated, is combined with a quantity of oxygen in an amount sufficient to oxidize a portion of the hydrocarbon feed. This oxidation reaction supplies the bulk of the heat necessary for the conversion of the hydrocarbon to desired products. For the conversion of liquid hydrocarbons to acetylene, a suitable combustion gas, such as hydrogen or mixtures of hydrogen with carbon oxides, and hydrocarbon is burned with oxygen under conditions conducive to complete oxidation of the combustion gas. The liquid hydrocarbon feed, preferably preheated, is injected into the hot combustion gases. Preheating of the liquid hydrocarbon feed should be kept substantially below reaction temperatures in order to avoid premature reactions.

The pyrolytic conversion of hydrocarbons is an endothermic reaction and the distribution of the pyrolysis reaction products is determined to a significant extent by the reaction temperature and the reaction time in addition to the feed composition. Pressure also influences product distribution. As a general rule, high temperatures combined with short reaction times favor the production of acetylene whereas lower temperatures and longer reaction times favor the production of ethylene. Conditions most favorable for the production of acetylene involve reaction temperatures between about 1,500° F. and about 3,000° F. with a reaction time between about .001 and 0.01 second. Unfortunately, conditions most favorable for the production of acetylene also tend to favor the production of acetylene homologues, such as methyl acetylene, vinyl acetylene, diacetylene, etc. in quantities sufficiently great to be objectionable in addition to other pyrolysis gases such as hydrogen, carbon monoxide, carbon dioxide and heavier hydrocarbons. The acetylene homologues are objectionable because they are highly unstable and tend to polymerize forming highly explosive polymers. Diacetylene is a particularly hazardous compound which can not be handled except in very dilute concentrations. Because of the hazards involved, relatively complicated procedures have been developed, employing expensive solvents, for separating acetylene from its homologues.

It is an object of this invention to provide an improved process for the preparation of acetylene.

It is another object of this invention to provide an efficient process for separating acetylene homologues from an acetylene containing pyrolysis gas.

It is another object of this invention to provide a process which prevents the polymerization of acetylene homologues.

It is another object of this invention to provide an improved method for removing acetylene homologues from a gas mixture containing acetylene, and other gaseous hydrocarbons, hydrogen and carbon oxides.

Various other objects and advantages of the invention will become apparent from the following detailed description and discussion.

According to the process of this invention, the above objects are accomplished by contacting the acetylene containing gas mixture with a heavy naphtha absorbent under conditions which favor the absorption of substantially all of the acetylene homologues together with a minor proportion of acetylene. The rich absorbent is passed to a first stripping zone where it is contacted with product gas to strip the absorbed acetylene. The absorbent free of absorbed acetylene but containing absorbed acetylene homologues is passed to a second stripping zone where it is contacted with a product gas to remove remaining absorbed hydrocarbons including non-polymerized acetylene homologues. The regenerated absorbent is recycled to the absorption zone.

In carrying out the process of this invention, the crude acetylene containing gas, produced by the pyrolysis of a hydrocarbon, is first treated to remove carbon, tar and carbon dioxide which are formed during the reaction. After this preliminary treatment, the acetylene containing gas is treated to remove water (formed during the reaction and picked up during the preliminary purification steps) by contact with a solvent having a suitably low freezing point such as acetone, methanol, ethanol, etc. A preferred solvent is methanol. After contact with the solvent, the gas which is completely saturated with solvent is cooled to condense out solvent and dissolved water and then passed to the naphtha absorption zone.

In the naphtha absorption zone, the acetylene containing gas is contacted with a heavy naphtha having a boiling range between about 300° F. and about 500° F. The boiling range of the naphtha is an important factor since too low boiling a fraction would result in the volatilization of the absorbent during subsequent stripping operations thereby contaminating product streams while too high boiling a fraction would complicate the separation of acetylene homologues from the absorbent. The naphtha absorption tower is operated at a temperature between about 60° F. and about −20° F. and preferably between about 10° F. and about −10° F. Low temperatures are preferred because of the tendency of acetylene homologues to polymerize at high temperatures. Pressure is maintained between about 30 p.s.i.a. and about 200 p.s.i.a. The $L/V$ ratio (mols of liquid naphtha per mols of gas) is maintained between about 0.01 and about 10 and preferably 0.05 to 2. An acetylene containing gas substantially free of acetylene homologues is removed from contact with the naphtha absorbent.

The naphtha absorbent containing acetylene homologues and as minor proportion of acetylene, is withdrawn from the absorption zone and passed to a stripping zone where it is contacted with product gas to remove absorbed acetylene. The term product gas, as used herein, means any of the pyrolysis gases such as hydrogen, methane, ethane, carbon monoxide, carbon dioxide and steam, singly or in admixture. An inert gas, such as nitrogen, can be used as stripping gas in place of product gas although there is no particular advantage in such substitution and in fact the use of inert gas is in many instances detrimental since a foreign component, which must subsequently be removed, is introduced into various product streams. In order to increase the efficiency of the process, the stripped acetylene is recycled and combined with feed gas. The stripping zone is maintained at a temperature between about 0° F. and about 80° F. and a pressure between about 15 p.s.i.a. and about 100 p.s.i.a. The $V/L$ ratio (mols of stripping gas per mol of liquid naphtha) is between about 0.01 to about 1. Under these conditions substantially all of the absorbed acetylene is stripped from the naphtha. The naphtha absorbent, free of acetylene but containing acetylene homologues, is withdrawn from the first stripping zone and introduced into a second stripping zone where it is maintained at a temperature between about 100° F. and about 280° F. and a pressure between about 15 p.s.i.a. and about 50 p.s.i.a. The stripping operation is carried out with a product gas at a $V/L$ ratio between about .05 and about 10. Substantially all of the acetylene homologues together with other absorbed gases are removed from the naphtha absorbent which is then recycled to the absorption zone for further use therein.

During the stripping operations to which the naphtha absorbent is subjected, some of the acetylene homologues will polymerize forming a high-boiling material. To prevent the build-up of this hazardous high-boiling material in the naphtha absorber, a portion of the stripped naphtha from the second stripping zone is continuously purged from the recycle stream. In order to minimize losses of absorbent, this purged stream is preferably treated in a third stripping zone maintained at a pressure between about 1 p.s.i.a. and about 10 p.s.i.a. and a temperature between about 200° F. and about 450° F. Under these conditions a portion of the naphtha is flashed and is withdrawn from the stripping zone. The liquid naphtha is stripped with a product gas, such as steam, to remove light boiling naphtha which is recycled to the absorption zone. The bottoms from this third stripping operation, which contain polymerized acetylene homologues, is purged from the system.

Referring to the accompanying drawing, which is a diagrammatic illustration of an acetylene recovery unit, about 1,206 mols per hour of a gas stream containing acetylene obtained by the pyrolysis of a light naphtha fraction and treated for the removal of carbon, tar and carbon dioxide is introduced, after compression by means not shown, through line 10 at a temperature of 100° F. and a pressure of 74 p.s.i.a. This gas has the composition given below in Table I.

TABLE I

| | Feed, mols per hour | $C_2H_6^+$ components | |
|---|---|---|---|
| $H_2$ | 379.1 | $C_2H_6$ | 9.42 |
| $CO$ | 372.9 | $C_3H_4{}^a$ | 8.02 |
| $CO_2$ | 0.1 | $C_3H_4{}^b$ | 3.21 |
| $N_2+A$ | 12.2 | $C_3H_6$ | 23.08 |
| $CH_4$ | 112.8 | $C_4H_2$ | .81 |
| $C_2H_2$ | 92.3 | $C_4H_4$ | 3.21 |
| $C_2H_4$ | 155.1 | $C_4H_6$ | 6.55 |
| $C_2H_6^+$ | 66.2 | $C_4H_8$ | 3.70 |
| $H_2O$ | 15.5 | $C_5H_8$ | 0.49 |
| Total | 1,206.2 | $C_5H_6$ | 1.95 |
| | | $C_5H_{10}$ | 0.93 |
| | | $C_5H_{12}$ | 1.55 |
| | | $C_6H_6$ | 2.24 |
| | | $C_6H_4$ | 1.05 |
| | | Total | 66.2 | a Methyl Acetylene.
b Propadiene.

From line 10, the gas flows into drying tower 11. In the process of this example, the gas is dried by counter-current contact with a stream of methanol introduced through line 12. Approximately 501 pounds per hour of methanol at a temperature of 100° F. flow through line 12 into the drying tower. The pyrolysis gas saturated with methanol vapor is withdrawn from drying tower 11 through line 13 at a temperature of 90° F. and a pressure of 72 p.s.i.a. The methanol saturated gas stream flowing in line 13 passes through heat exchanger 14 where its temperature is lowered to −10° F. The cooled stream is introduced into knock-out drum 15 where condensed methanol containing dissolved water is separated from the acetylene containing gas. Condensed methanol is withdrawn from knock-out drum 15 through line 16 and is combined with the bottoms from drying tower 11 which are withdrawn through line 17. The combined methanol stream is then recovered by means not shown. Dry acetylene containing gas is withdrawn overhead from knock-out drum 15, through line 18 and is introduced into absorption column 19 which is operated at a bottoms temperature of 0° F. and a pressure of 69 p.s.i.a. and a top temperature of 2° F. and 66 p.s.i.a. Approximately 164,840 pounds per hour of heavy naphtha ($L/V=1$) are introduced into the top of absorption column 19 through line 20 as discussed more fully below. Approximately 1,087.8 mols per hour of acetylene containing gas substantially free of acetylene homologues are withdrawn from absorption column 19 through line 21 as product. The composition of this gas is given below in Table II. ($C_2H_6^+$ includes $C_2$ to $C_6$ hydrocarbons.)

TABLE II

| | Mols per hour |
|---|---|
| $H_2$ | 378.1 |
| $CO$ | 367.4 |
| $N_2$ | 12.0 |
| $CH_4$ | 109.8 |
| $CO_2$ | .12 |
| $C_2H_2$ | 82.58 |
| $C_2H_4$ | 129.13 |
| $C_2H_6^+$ | 8.67 |
| Total | 1,087.8 |

Approximately 168,900 pounds per hour of rich naphtha absorbent containing 4,065 pounds per hour of absorbed hydrocarbons are withdrawn from the bottom of absorber 19 through line 22 at a temperature of 0° F. This bottoms stream is heated, in heat exchanger 23, with naphtha feed flowing through line 20. As a result of indirect heat exchange, the temperature of the bottoms stream in line 22 is increased to 48° F. at which temperature it is introduced into the top of naphtha pre-stripper 24. The pre-stripper is operated at a bottom pressure of 17.7 p.s.i.a. and a top pressure of 15 p.s.i.a. In pre-stripper 24 the rich naphtha absorbent is stripped by counter-current contact with approximately 54.2 mols per hour of product gas, which is introduced into the stripping column through line 25 ($V/L=.05$). This gas contains approximately equimolar amounts of hydrogen and carbon monoxide (tail gas from an ethylene unit). Absorbed acetylene, ethylene and other light gases are withdrawn from pre-stripper 24 through line 26. The composition of this stream is given below in Table III.

TABLE III

| | Mols per hour |
|---|---|
| $N_2$ | 0.98 |
| $H_2$ | 24.56 |
| $CO$ | 28.40 |
| $CH_4$ | 9.81 |
| $C_2H_2$ | 9.30 |
| $C_2H_4$ | 24.50 |
| $C_2H_6^+$ | 11.71 |
| | [1] 109.26 |

[1] Or, 2,447 pounds per hour.

Because this stream contains acetylene and other valuable product gases, it is compressed to 74 p.s.i.a., by means not shown, and combined with the feed stream entering at line 10. Approximately 167,200 pounds per hour of naphtha containing absorbed acetylene homologues are withdrawn from the bottom of pre-stripper 24 through line 27 at a temperature of 45° F. This bottom stream is pumped, via pump 28, through heat exchanger 29 where its temperature is increased to 170° F. by heat exchange with naphtha feed flowing through line 20. The thus heated stream in line 27 is further heated to a temperature of 210° F. by heat exchange with steam in heat exchanger 30 and is introduced into naphtha stripper 31. Naphtha stripper 31 is maintained at a temperature of 200° F., a bottom pressure of 33 p.s.i.a. and a top pressure of 29.4 p.s.i.a.

In the operation of naphtha stripper 31 two stripping gases (total V/L=0.3) are employed because of the large amount of gas required to operate stripper 31. The first product gas contains some $CO_2$ which interferes with the efficiency of naphtha absorption zone. This first product gas efficiently strips acetylene homologues etc., while the second product gas also strips acetylene homologues and in addition the undesired $CO_2$. The composition of the stripping gases is given below in Table IV.

TABLE IV

|  | Stripping gas | |
|---|---|---|
|  | Line 32, mols per hour | Line 33, mols per hour |
| $N_2$ | 6.6 | 3.2 |
| $H_2$ | 34.5 | 101.1 |
| CO | 5.6 | 98.1 |
| $CO_2$ | 3.7 | |
| $CH_4$ | 51.4 | 29.3 |
| $C_2H_6{}^+$ | 1.3 | 0.7 |
|  | 103.1 | 232.4 |

The naphtha stream introduced, through line 27 to stripper 31 is initially contacted with 103.1 mols per hour of product gas introduced through line 32. Approximately 232.4 mols per hour of $CO_2$ free product gas are introduced through line 33 to the bottom of stripper 31 to further strip the naphtha absorbent and to remove absorbed $CO_2$. An overhead containing stripped contaminants and naphtha is removed from stripper 31 via line 35, cooled in cooler 36 and introduced into knock-out drum 37. Condensed naphtha is removed from the bottom of knock-out drum 37 through line 38 and is pumped to the top of stripper 31 by pump 39. A gas stream having the composition given in Table V is removed from the top of drum 37 through line 40.

TABLE V

|  | Mols per hour |  | $C_2H_6{}^+$ components |
|---|---|---|---|
| $H_2$ | 135.6 | $C_2H_2$ | .42 |
| CO | 103.7 | $C_2H_4$ | 2.30 |
| $CO_2$ | 3.7 | $C_2H_6$ | 1.75 |
| $N_2+A$ | 9.8 | $C_3H_4{}^a$ | 6.90 |
| $CH_4$ | 80.5 | $C_3H_4{}^b$ | 2.61 |
| $C_2H_6{}^+$ | 52.5 | $C_3H_6$ | 17.97 |
|  |  | $C_4H_2$ | .75 |
| Total | 386.0 | $C_4H_4$ | 2.83 |
|  |  | $C_4H_6$ | 7.05 |
|  |  | $C_4H_8$ | 3.43 |
|  |  | $C_5H_6$ | 1.92 |
|  |  | $C_5H_8$ | .49 |
|  |  | $C_5H_{10}$ | .90 |
|  |  | $C_6H_6$ | 2.20 |
|  |  | $C_6H_4$ | 1.03 |
|  |  | Total | 52.54 | a Methyl Acetylene.
b Propadiene.

Approximately 164,611 pounds per hour of regenerated naphtha is withdrawn from the bottom of stripper 31 through line 41. During the stripping operation some of the heavy acetylenes will polymerize forming a gum. To prevent the build-up of these hazardous polymerized acetylene homologues in the recycle naphtha stream, approximately 2,973 pounds per hour of naphtha are withdrawn from line 41 through line 42, heated to 250° F. in heat exchanger 43 and introduced into recovery tower 44. Recovery tower 44 operates at a temperature of 250° F., a bottom pressure of 3.2 p.s.i.a. and a top pressure of 2.2 p.s.i.a. Approximately 270 pounds per hour of 300 p.s.i.g. stream are introduced into the bottom of recovery tower 44 through line 45 to strip off light naphtha. Approximately 417 pounds per hour of heavy naphtha containing absorbed polymerized acetylene homologues are withdrawn from the bottom of tower 44 through line 53. A light naphtha fraction is withdrawn from tower 44 through line 46, cooled by cooler 47 and introduced into separator 48 at a temperature of 100° F. and a pressure of 1.7 p.s.i.a. 270 pounds per hour of condensed water are withdrawn from separator 48 through line 49. Approximately 2,554 pounds per hour of recovered naphtha are withdrawn from separator 48 through line 50, repressured by pump 51 and introduced into naphtha storage tank 52. Fresh naphtha, having the composition given in Table VI, is added to tank 52 as needed, through line 54.

TABLE VI

Naphtha Solvent [1] (*Used for Removal of Higher Acetylenes and Higher Hydrocarbons*)

Sp. gravity at 15° C./4° C. _____ 0.786.
Flash point _____ 114° F. (46° C.).
Freezing point _____ −54° C.
Aromatic content _____ 15.5 vol. percent.
Bromine No. _____ 1.7.

[1] Molecular weight=151.6.

DISTILLATION CURVE

|  | ° F. |
|---|---|
| IBP | 330.5 |
| 5% | 341.5 |
| 10% | 347 |
| 20% | 355 |
| 30% | 361 |
| 40% | 367.5 |
| 50% | 374 |
| 60% | 381 |
| 70% | 390 |
| 80% | 401 |
| 90% | 417 |
| FBP | 446 |

Approximately 3,200 pounds per hour of fresh naphtha are withdrawn from tank 52 from line 55, introduced into line 56 containing pump 57. The naphtha flowing in line 56 is combined with the regenerated naphtha in line 58. The combined naphtha stream flows through line 56, at a temperature of 199° F., is heat exchanged in heat exchanger 29 with the bottoms from pre-stripper 24 to reduce temperature to 72° F. and is then introduced into line 20, cooled to 24° F. by heat exchange in heat exchanger 23 with the bottoms from absorber 19 and finally cooled to −12° F. by heat exchange with liquid ammonia in exchanger 60. This naphtha stream then enters the top of absorber 19 as previously discussed.

While this invention has been described with particular reference to the removal of acetylene homologues, because of the hazards involved in the handling of these materials, it will be apparent from the foregoing description that the invention also provides for the removal of other objectional $C_2$-$C_6$ hydrocarbon impurities, both saturated, and unsaturated, including dienes which, although not hazardous, also tend to polymerize thereby causing fouling of the equipment.

Various modifications and alterations of the process of this invention will be apparent to those skilled in the art and may be used without departing from the scope of the invention.

We claim:
1. A process for separating hydrocarbon impurities including methyl acetylene from a gas mixture obtained by the pyrolysis of light hydrocarbons containing said impurities and acetylene which comprises: contacting said gas mixture in an absorption zone with a heavy naphtha absorbent under suitable conditions to absorb said impurities including substantially all of said methyl acetylene and a minor amount of acetylene from said gas mixture, and contacting the bottoms from said absorption zone with a stripping gas in a stripping zone maintained under suitable conditions to remove absorbed acetylene without substantial vaporization of said heavy naphtha absorbent.

2. A process for separating hydrocarbon impurities including methyl acetylene from a gas mixture obtained by the pyrolysis of light hydrocarbons containing said impurities and acetylene which comprises: contacting said gas mixture in an absorption zone wtih a heavy naphtha absorbent under suitable conditions to absorb said impurities including substantially all of said methyl acetylene and a minor amount of acetylene from said gas mixture, contacting the bottoms from said absorption zone with a stripping gas in a first stripping zone maintained under suitable conditions to remove absorbed acetylene without substantial vaporization of said heavy naphtha absorbent, contacting the bottoms from said first stripping zone in a second stripping zone with a stripping gas to remove absorbed hydrocarbon impurities.

3. A process for separating hydrocarbon impurities including methyl acetylene from a gas mixture obtained by the pyrolysis of light hydrocarbons containing said impurities and acetylene which comprises: contacting said gas mixture in an absorption zone with a heavy naphtha absorbent under suitable conditions to absorb the impurities including substantially all of said methyl acetylene and a minor amount of the acetylene from said gas mixture, contacting the bottoms from said absorption zone with a stripping gas in a first stripping zone maintained under suitable conditions to remove absorbed acetylene without substantial vaporization of said heavy naphtha absorbent, contacting the bottoms from said first stripping zone in a second stripping zone with a stripping gas to remove absorbed hydrocarbon impurities, and recycling at least a portion of said naphtha absorbent from the bottom of said second stripping zone to said absorption zone.

4. A process for separating hydrocarbon impurities including methyl acetylene from a gas mixture obtained by the pyrolysis of light hydrocarbons containing the same and acetylene which comprises: contacting said gas mixture in an absorption zone maintained at a temperature between about 60° F. and about —20° F. and a pressure between about 30 p.s.i.a. and about 200 p.s.i.a. with a heavy naphtha absorbent in which said impurities including substantially all of said methyl acetylene and a minor amount of acetylene are absorbed, withdrawing an acetylene containing gas substantially free of said impurities overhead from said absorption zone, contacting the bottoms from the absorption zone with a product gas in a product gas to naphtha absorbent mol ratio between about 0.01 and about 1 in a first stripping zone to remove absorbed acetylene with substantial vaporization of said heavy naphtha absorbent, contacting the bottoms from said first stripping zone with a product gas in a product gas to naphtha absorbent mol ratio between about 0.05 and about 10 in a second stripping zone to remove said absorbed hydrocarbon impurities from said naphtha absorbent.

5. A process for the separation of hydrocarbon impurities including methyl acetylene and other acetylene homologues from a gas mixture obtained by the pyrolysis of light hydrocarbons containing said impurities and acetylene which comprises: contacting said gas mixture in an absorption zone with a heavy naphtha fraction having a boiling range between about 300° F. and about 500° F. at a temperature between about 60° F. and about —20° F. and a pressure between about 30 p.s.i.a. and about 200 p.s.i.a. thereby absorbing said impurities including substantially all of said methyl acetylene and a minor amount of acetylene from said gas mixture, contacting bottoms from the absorption zone with a product gas in a product gas to naphtha absorbent mol ratio between about 0.01 and about 1 in a first stripping zone to remove absorbed acetylene without substantial vaporization of said heavy naphtha absorbent, contacting the bottoms from said first stripping zone with a product gas in a product gas to naphtha absorbent mol ratio between about 0.05 and about 10 in a second stripping zone to remove absorbed impurities, withdrawing naphtha absorbent substantially free of said impurities from the bottom of said second stripping zone and recycling at least a portion of said naphtha absorbent to said absorption zone.

6. A process for the separation of hydrocarbon impurities including methyl acetylene and other acetylene homologues from a gas mixture obtained by the pyrolysis of light hydrocarbons containing said impurities and acetylene which comprises: contacting said gas mixture in an absorption zone with a heavy naphtha fraction having a boiling range between about 300° F. and about 500° F. at a temperature between about 60° F. and about —20° F. and a pressure between about 30 p.s.i.a. and about 200 p.s.i.a. thereby absorbing said impurities including substantially all of said methyl acetylene and a minor amount of acetylene from said gas mixture, withdrawing an acetylene containing gas substantially free of said impurities from the top of said absorption zone, contacting bottoms from said absorption zone with a product gas in a product gas to naphtha absorbent mol ratio between about 0.01 and about 1 in a first stripping zone maintained at a temperature between about 0° F. and about 80° F. and a pressure between about 15 p.s.i.a. and about 100 p.s.i.a. to remove absorbed acetylene without substantial vaporization of said heavy naphtha absorbent, contacting bottoms from said first stripping zone with a product gas in a product gas to naphtha absorbent mol ratio between about 0.05 and about 10 in a second stripping zone maintained at a temperature between about 100° F. and about 280° F. and a pressure between about 15 p.s.i.a. and about 50 p.s.i.a. to remove absorbed impurities, withdrawing naphtha absorbent substantially free of said impurities from the bottom of said second stripping zone and recycling at least a portion of said naphtha absorbent to said absorption zone.

7. A process for the separation of hydrocarbon impurities including methyl acetylene and other acetylene homologues from a gas mixture obtained by the pyrolysis of light hydrocarbons containing said impurities and acetylene which comprises: contacting said gas mixture in an absorption zone with a heavy naphtha fraction having a boiling range between about 300° F. and about 500° F. at a temperature between about 60° F. and about —20° F. and a pressure between about 30 p.s.i.a. and about 200 p.s.i.a. thereby absorbing said impurities including substantially all of said methyl acetylene and a minor amount of acetylene from said gas mixture, withdrawing an acetylene containing gas substantially free of said impurities from the top of said absorption zone, contacting bottoms from said absorption zone with a pyrolysis product gas in a pyrolysis product gas to naphtha absorbent mol ratio between about 0.01 and about 1 in a first stripping zone maintained at a temperature between about 0° F. and about 80° F. and a pressure between about 15 p.s.i.a. and about 100 p.s.i.a. to remove absorbed acetylene as an overhead stream substantially free of vaporized heavy naphtha absorbent, recycling said overhead stream to said absorption zone, contacting the bottoms from said first stripping zone with a pyrolysis product gas in a product gas to naphtha absorbent mol ratio between about 0.05 and about 10 in a second stripping zone maintained at a temperature between about 100° F. and about 280° F. and a pressure between about 15 p.s.i.a. and about 50 p.s.i.a. to remove absorbed impurities, withdrawing naphtha absorbent substantially free of said impurities from the bottom of said second stripping zone and recycling at least a portion of said naphtha absorbent to said absorption zone.

8. In a process for the preparation of acetylene in which a hydrocarbon is pyrolyzed to produce a gas mixture containing acetylene, hydrogen, carbon monoxide and $C_2$–$C_6$ hydrocarbon impurities including methyl acetylene and other acetylene homologues, the method for separating said impurities from said gas mixture which comprises: introducing said gas mixture into an absorption zone in which said impurities including substantially all of said methyl acetylene and a minor amount of acetylene are absorbed in a heavy naphtha absorbent, passing bottoms from said absorption zone to a first stripping zone wherein they are contacted with a pyrolysis product gas for the removal of absorbed acetylene without substantial vaporization of said heavy naphtha absorbent, passing bottoms from said first stripping zone to a second stripping zone in which they are contacted with a greater quantity of pyrolysis product gas in comparison to the quantity used in said first stripping zone thereby removing absorbed impurities from said naphtha absorbent.

9. In a process for the preparation of acetylene in which a hydrocarbon is pyrolyzed to produce a gas mixture containing acetylene, hydrogen, carbon monoxide and $C_2$–$C_6$ hydrocarbon impurities including methyl acetylene and other acetylene homologues, the method for separating said impurities from said gas mixture which comprises: introducing said gas mixture into an absorption zone in which said impurities including substantially all of said methyl acetylene and a minor amount of acetylene are absorbed in a heavy naphtha absorbent, passing bottoms from said absorption zone to a first stripping zone wherein they are contacted with a pyrolysis product gas for the removal of absorbed acetylene without substantial vaporization of said heavy naphtha absorbent, withdrawing said absorbed acetylene overhead from said first stripping zone and recycling same to said absorption zone, passing bottoms from said first stripping zone to a second stripping zone in which they are contacted with a greater quantity of pyrolysis product gas in comparison to the quantity used in said first stripping zone thereby removing absorbed impurities from said naphtha absorbent.

10. In a process in which a hydrocarbon is pyrolyzed to produce a gas mixture containing acetylene, hydrogen, carbon monoxide and $C_2$–$C_6$ hydrocarbon impurities including methyl acetylene and other acetylene homologues, the method of separating said impurities from the gas mixture which comprises: introducing the gas mixture into an absorption zone wherein said impurities including substantially all of said methyl acetylene and a minor amount of acetylene are absorbed in a naphtha absorbent having a boiling range between about 300° F. and about 500° F., said absorption zone being maintained at a temperature between about 60° F and about —20° F. and a pressure between about 30 p.s.i.a. and about 200 p.s.i.a., passing bottoms from said absorption zone to a first stripping zone wherein they are contacted with a pyrolysis product gas for the removal of absorbed acetylene without substantial vaporization of said heavy naphtha absorbent, the mol ratio of said product gas to said naphtha absorbent being between about .01 and about 1, passing bottoms from said first stripping zone to a second stripping zone wherein they are contacted with a pyrolysis product gas in a mol ratio of pyrolysis product gas to naphtha absorbent between about 0.05 and about 10 to remove absorbed impurities, withdrawing naphtha absorbent substantially free of impurities from the bottom of said second stripping zone and recycling at least a portion of said naphtha absorbent to said absorption zone.

11. In a process in which a hydrocarbon is pyrolyzed to produce a gas mixture containing aceylene, hydrogen, carbon monoxide and $C_2$–$C_6$ hydrocarbon impurities including methyl acetylene and other acetylene homologues, the method of separating said impurities from the gas mixture which comprises: introducing the gas mixture into an absorption zone wherein said impurities including substantially all of said methyl acetylene and a minor amount of acetylene are absorbed in a naphtha absorbent having a boiling range between about 300° F. and about 500° F., said absorption zone being maintained at a temperature between about 60° F. and about —20° F. and a pressure between about 30 p.s.i.a. and about 200 p.s.i.a., passing bottoms from said absorption zone to a first stripping zone wherein they are contacted with a pyrolysis gas for the removal of absorbed acetylene without substantial vaporization of said heavy naphtha absorbent, the mol ratio of said product gas to said naphtha absorbent being between about .01 and about 1, withdrawing acetylene containing gas overhead from said first stripping zone and recycling same to said absorption zone, passing bottoms from said first stripping zone to a second stripping zone wherein they are contacted with a pyrolysis product gas in a mol ratio of pyrolysis product gas to naphtha absorbent between about 0.05 and about 10 to remove absorbed impurities, withdrawing naphtha absorbent substantially free of impurities from the bottom of said second stripping zone and recycling at least a portion of said naphtha absorbent to said absorption zone.

References Cited in the file of this patent

UNITED STATES PATENTS

| 1,422,183 | Curme | July 11, 1922 |
| 2,301,240 | Baumann et al. | Nov. 10, 1942 |
| 2,714,940 | Milligan | Aug. 9, 1955 |
| 2,838,133 | Schreiner | June 10, 1958 |

FOREIGN PATENTS

| 797,120 | Great Britain | June 25, 1958 |

UNITED STATES PATENT OFFICE
CERTIFICATE OF CORRECTION

Patent No. 3,023,843              March 6, 1962

George Craig Grubb et al.

It is hereby certified that error appears in the above numbered patent requiring correction and that the said Letters Patent should read as corrected below.

Column 2, line 59, for "as" read -- a --; column 5, TABLE V, column 4, line 7 thereof, for ".75" read -- .74 --; column 7, line 56, for "with" read -- without --; column 10, line 28, after "pyrolysis" insert -- product --.

Signed and sealed this 29th day of May 1962.

(SEAL)
Attest:

ERNEST W. SWIDER
Attesting Officer

DAVID L. LADD
Commissioner of Patents